United States Patent

[11] 3,623,742

| [72] | Inventors | Wilmer E. Funk<br>Roanoke;<br>Howard M. Hilgers, East Peoria; Eugene R.<br>Martin, East Peoria, all of Ill. |
|---|---|---|
| [21] | Appl. No. | 855,287 |
| [22] | Filed | Sept. 4, 1969 |
| [45] | Patented | Nov. 30, 1971 |
| [73] | Assignee | Caterpillar Tractor Co.<br>Peoria, Ill. |

[54] JAW CHUCK
11 Claims, 4 Drawing Figs.

[52] U.S. Cl. .............................................. 279/65,
29/470.3, 228/2
[51] Int. Cl. ............................................... B23b 31/12
[50] Field of Search........................................ 279/58, 51,
59, 55, 60, 65; 228/2; 29/470.3

[56] References Cited
UNITED STATES PATENTS
1,509,997  9/1924  Fry .................................. 279/58 X

| 2,792,230 | 5/1957 | Schober ....................... | 279/58 X |
|---|---|---|---|
| 3,512,792 | 5/1970 | Farley et al. ................. | 279/51 |
| | | FOREIGN PATENTS | |
| 7,869 | 1896 | Sweden ....................... | 279/58 |
| 566,092 | 1944 | Great Britain ................ | 279/58 |

Primary Examiner—Andrew R. Juhasz
Assistant Examiner—James F. Coan
Attorney—Fryer, Tjensvold, Feix, Phillips & Lempio ABSTRACT: A chuck assembly for securing generally cylindrical workpieces which have rough surfaces or which are otherwise not uniform or concentric. A relatively large number of jaw members are arranged in respective register with ramp surfaces at circumferentially spaced locations about an interior bore of the chuck. A draw bar is associated with each of the jaw members by means of a ring member for positioning the jaw members and initially engaging them upon the workpiece. An actuator block is arranged for axial engagement with the workpiece and is associated with the ring member for further shifting the jaw members and increasing their engagement with the workpiece during operation.

PATENTED NOV 30 1971 3,623,742
SHEET 1 OF 3

INVENTORS
WILMER E. FUNK
HOWARD M. HILGERS
EUGENE R. MARTIN
BY
Fryer, Tjensvold, Feix, Phillips & Lempio
ATTORNEYS

INVENTORS
WILMER E. FUNK
HOWARD M. HILGERS
EUGENE R. MARTIN

ATTORNEYS

JAW CHUCK

The present invention relates to jaw chucks. More particularly, it relates to a chuck having a relatively large number of jaw members which are initially engaged upon a workpiece by means of a draw bar acting through a ring member, the jaw members being further engaged with the workpiece by means of an actuator block which is axially engaged by the workpiece and associated for movement with the ring member. The chuck assembly as described below is particularly adapted for use in a friction welding machine although it will be apparent that its use is not limited to such applications.

In applications such as friction welding, workpieces must be firmly secured in precise alignment within a chuck assembly while being rotated at very high speeds. The chuck assembly must also withstand very large axial forces which act upon a workpiece. The securing of a workpiece within the chuck is made much more difficult when the outer surface of the workpiece is rough or otherwise not uniform.

The present invention provides a chuck assembly suitable for securing such a workpiece and maintaining it in proper alignment under conditions such as those discussed above. The chuck assembly includes a relatively large number of jaw members arranged in register with respective ramp surfaces located in circumferentially spaced relation about an internal bore of the chuck assembly, a draw bar being associated with the jaw members by means of a ring member to initially engage them upon the workpiece with an actuator block also associated with the ring members and arranged for axial engagement with the workpiece to further increase engagement of the jaw members upon the workpiece during operation of the chuck.

The relatively large number of jaw members insures adequate contact with the workpiece while the combined use of the draw bar and actuator block insures firm engagement of the jaw members upon the workpiece. The chuck assembly preferably has approximately 6 to 12 jaw members which are arranged for engagement about the circumference of the workpiece. Although the chuck assembly preferably includes a number of jaw members within the above range, it is particularly contemplated that a sufficient number of jaw members be included within the assembly to insure firm contact in at least three positions about the circumference of the workpiece by the jaw members. In this manner, the chuck assembly is capable of firmly securing generally cylindrical workpieces having external surfaces which are not uniform or concentric. For example, the chuck assembly may be employed to secure workpieces having a hexagonal configuration.

Most prior art chuck assemblies are inadequate in applications of the type summarized above because they either fail to provide adequate contact with the workpiece or fail to provide adequate force for firmly engaging the jaws upon the workpiece. Split collet chucks are commonly employed in such applications where the workpiece has a uniform surface. However, when the workpiece surface is rough or otherwise not uniform, the collet sleeve may only provide contact with the workpiece at two positions making accurate axial positioning of the workpiece difficult if not impossible. Most jaw chucks in the prior art also fail to include means for adequately engaging the workpiece in the manner contemplated by the present invention. Still further, many of these jaw chucks do not provide for adequate radial motion of the jaws in order to insure adequate contact with the workpiece.

Accordingly, it is an object of the present invention to provide a jaw chuck assembly for firmly securing generally cylindrical workpieces which have rough or nonuniform surfaces.

It is a further object to provide such a chuck assembly including relatively large numbers of jaw members to insure adequate contact with the workpiece.

It is a still further object to provide such a chuck assembly wherein the jaw members are initially engaged by a draw bar acting upon the jaw members by a ring member with an actuator block being axially engaged by the workpiece to further engage the jaw members upon the workpiece during operation.

It is a still further object to provide a chuck assembly wherein substantially radial movement of the jaw members is possible to insure gripping contact of at least three of the jaws with the workpiece.

Other objects and advantages of the invention are made apparent in the following description having reference to the accompanying drawings.

Figure 1:
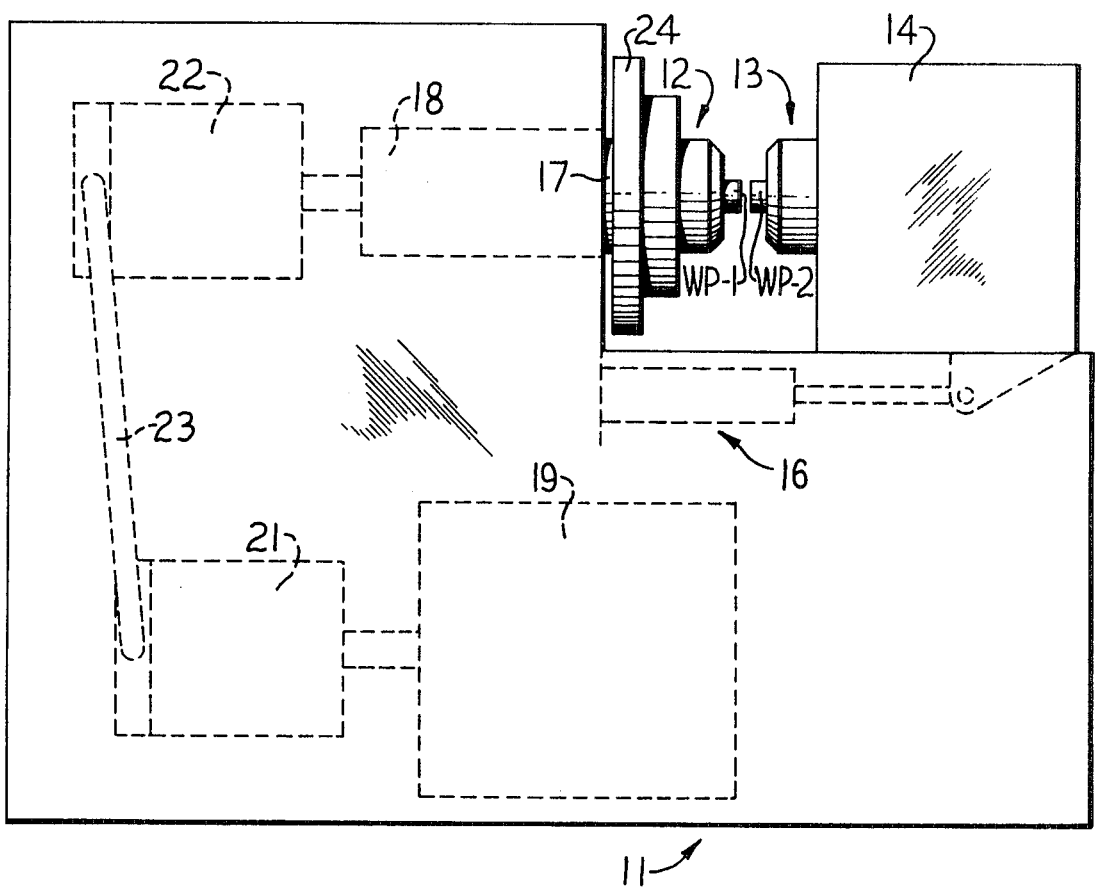
FIG. 1 is a side elevation view, partially in diagrammatic form, of an inertia welding machine.

A friction welding machine is illustrated in FIG. 1 as an exemplary setting for an improved chuck according to the present invention. The machine has a frame 11 with two chuck assemblies 12 and 13 for respectively mounting two workpieces, WP-1 and WP-2, which are suitable for joining by conventional friction welding techniques. The chuck 13 is secured against rotation and mounted upon a tailstock fixture 14. The tailstock fixture is mounted for axial movement on the machine frame under the control of a load cylinder 16. A pressure control circuit (not shown) regulates pressure in the load cylinder and thus determines the force with which the parts WP-1 and WP-2 are axially engaged.

The chuck 12 is mounted upon a spindle 17 which is disposed within a bearing assembly 18 to provide a rotatable mount for the chuck 12. An electric motor 19 rotates the spindle 12 through a hydrostatic transmission which includes a hydraulic pump 21, a hydraulic motor 22 and a manifold 23 between the pump and motor. One or more inertia weights 24 may be mounted upon the spindle in accordance with conventional inertia welding techniques.

The present invention is particularly concerned with construction of the chuck 12 to securely grip the workpiece WP-1. Within the present invention, the chuck assembly is contemplated for use with a generally cylindrical workpiece which has a rough or otherwise nonuniform surface. Forged parts are a particular example of nonconcentric workpieces which the present chuck assembly is suitable for securing. However, the present assembly may also be used with other types of workpieces which are generally cylindrical but not uniform. One such example would be a workpiece having a hexagonal configuration. The chuck assembly is also particularly suitable for use with relatively large workpieces which must be accurately positioned while being subject to high rotational speeds and large axial loads.

Figure 2:
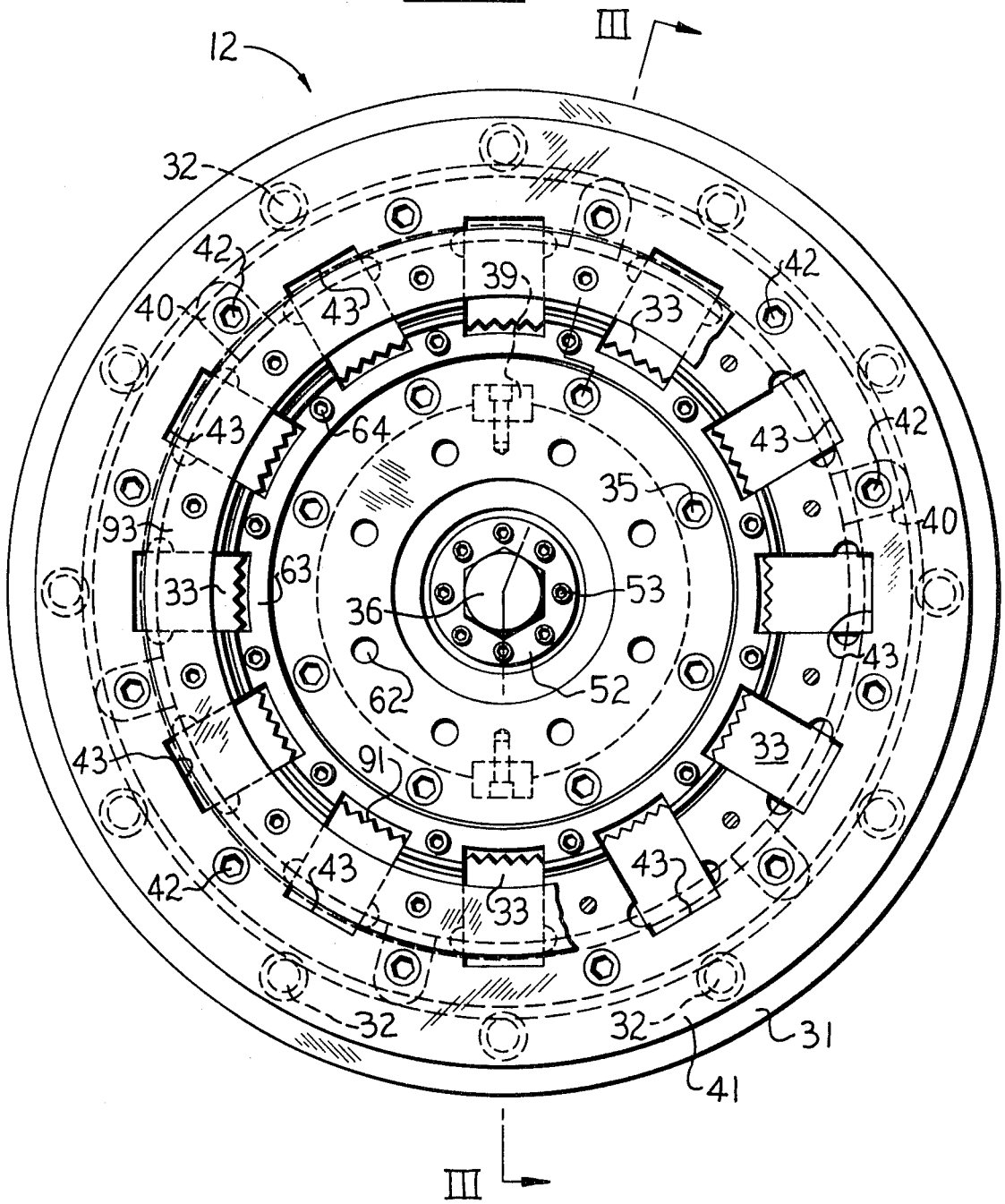
FIG. 2 is a side elevation view, with parts in section, of a chuck assembly constructed according to the present invention and adapted for use in an inertia-welding machine such as that shown in FIG. 1.
Figure 3:
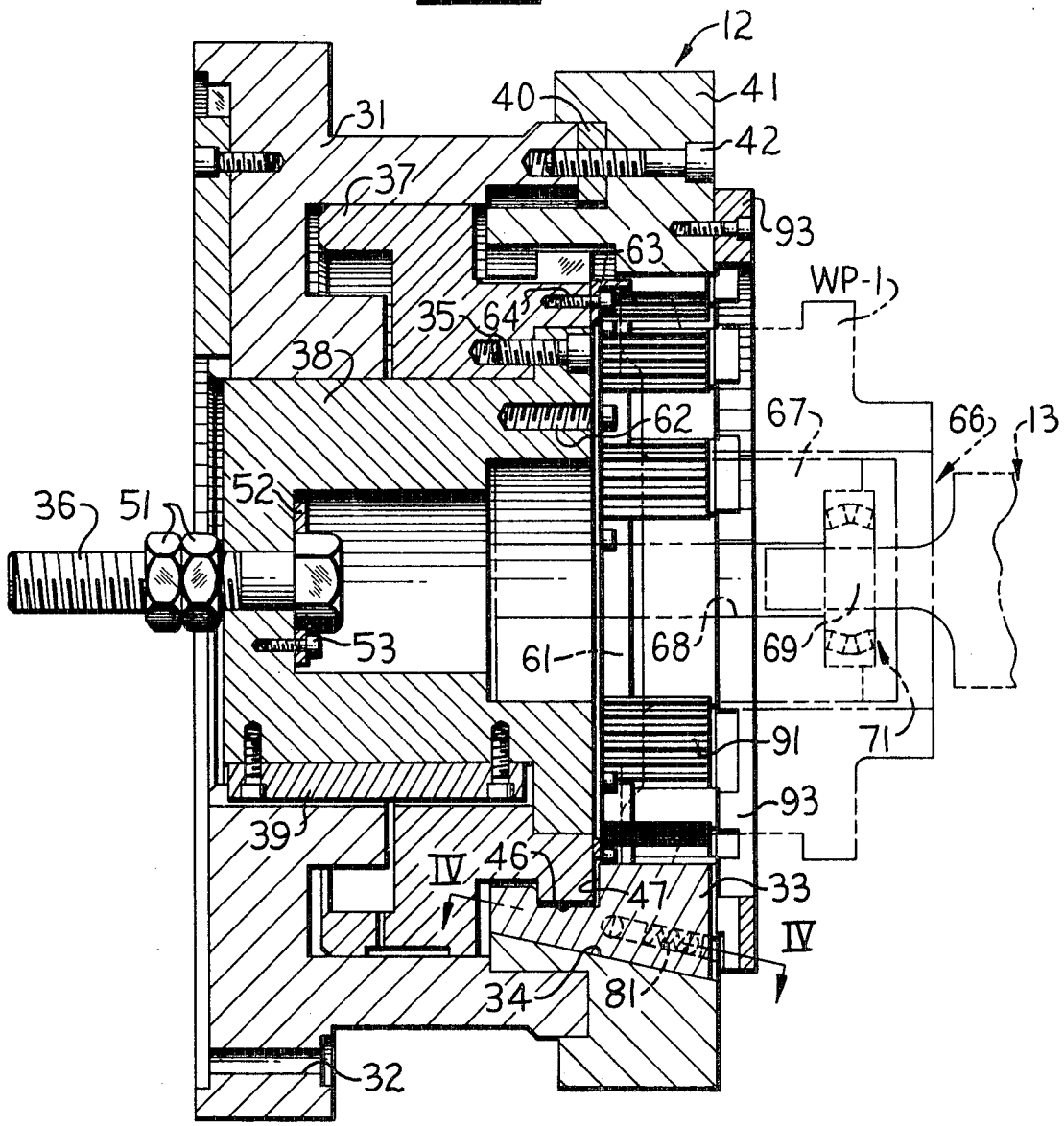
FIG. 3 is a view taken along section line III—III of FIG. 2.

The chuck assembly of FIGS. 2 and 3 includes a hollow and cylindrical housing or chuck body 31 which may be secured for rotation upon a spindle such as that shown in FIG. 1 by means such as cap screws (not shown) through holes such as that indicated at 32 within the chuck body. The chuck body rotatably supports a relatively large number, preferably 6 to 12, jaw members 33 which are axially slidable in respective register with ramp surfaces such as that indicated at 34 in FIG. 3. The jaw members are initially engaged upon the workpiece WP-1 by means of a draw bar 36 which is associated with the draw members by means of a ring member 37 and an actuator block 38. The actuator block 38 is arranged for axial engagement with the workpiece WP-1 so that axial forces applied to the workpiece are transferred by the actuator bar to the jaw member for further tightening of the jaw member upon the workpiece. The relatively large number of jaw members insures adequate contact with the workpiece. As is discussed in greater detail below, the workpieces are also designed for substantial radial motion under influence of the draw bar and actuator block to insure firm contact of at least three of the jaws with the workpiece. Increased radial motion of the jaw members is mainly controlled by the wedge angle with which the jaw member engaged the ramp surfaces such as that indicated at 34 in FIG. 3.

The ring member 37 and the actuator block 38 which are fixed together by cap screws such as that indicated at 35, are secured for rotation with the chuck body 31 by means of a plurality of keys, one of which is indicated at 39. Additional keys, such as that indicated at 40 prevent relative rotation between a face ring 41 and the chuck body 31. The annular face member 41 is secured to the chuck body 31 by means of a plurality of cap screws such as that indicated at 42. The face member 41 forms a bore within the chuck assembly for receiving the workpiece WP-1. The face member 41 is formed with a large number of slots, one of which is indicated at 43 in FIG. 2, to maintain the jaw members 33 in proper register with the ramp surfaces 34. Each jaw member is notched, as indicated at 46 in FIG. 3, for engagement with an annular flange 47 on the ring member 37. In this manner, the jaw members are maintained within the slots 43 while being effectively coupled for axial movement with the draw bar 36 by means of the actuator block 38.

The draw bar assembly is indicated by an adjustable cap screw at 36. Axial movement of the jaw members by the draw bar assembly may be regulated by adjusting the cap screw 36 within another threaded portion (not shown) of the draw bar assembly. A pair of locking nuts 51 permit the jaw members to be moved in either axial direction by the draw bar. A locking ring 52 is secured in place about the head of the cap screw 36 by bolts, one of which is indicated at 53, to prevent the cap screw 36 from turning during operation of the chucks.

To provide better axial engagement between the actuator block 38 and the workpiece WP-1, a backup plate 61 is secured to the exposed end of the actuator block 38 by means such as that indicated at 62. The surface of the backup plate 61 opposite the actuator block 38 generally conforms with the workpiece WP-1. A thin seal-type ring 63 is secured to the ring member 37 by cap screws such as that indicated at 64 to prevent dirt and foreign material from entering the interior of the chuck assembly.

In friction welding machinery and similar applications, it is necessary to maintain the workpieces (indicated at WP-1 and WP-2 in FIG. 1,) in proper axial alignment throughout the entire operation. This presents a particular problem when the workpieces are of relatively large diameter and weight. To insure proper axial alignment of the workpieces, the present invention provides a piloting arrangement indicated at 66 which aligns the workpieces by insuring axial alignment between the two chuck assemblies 12 and 13 (see FIG. 1). The pilot arrangement 66 is preferably arranged along the axis of the two chuck assemblies for use with workpieces which are of tubular configuration as is shown for the workpiece WP-1 in FIG. 3. The pilot assembly includes an outward extension 67 from the backup plate 61. The extension 67 has an axially arranged bore 68 to receive an axially arranged pin 69 extending from the tailstock chuck 13. The extension 67 also has a ball bearing mount 71 for rotatably supporting the pin 69 when the two workpieces WP-1 and WP-2 are axially engaged by bringing the two chuck assemblies 12 and 13 together. Neither the extension 67 nor the pin 66 contacts either of the workpieces since the surfaces of the workpieces are often not sufficiently smooth or concentric to serve as a reference.

Figure 4:
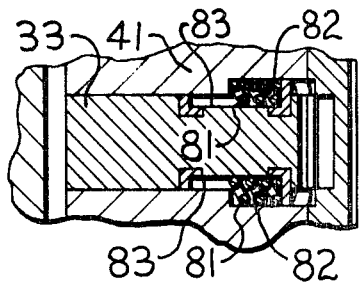
FIG. 4 is a view taken along section line IV—IV of FIG. 3.

Each of the jaw members 33 includes spring means which tend to release the jaw members from the workpiece when engaging forces are not acting upon the jaw members through the draw bar 36 or the actuator block 38 by means of the workpiece WP-1. Referring particularly to FIGS. 3 and 4, coil springs, one of which is indicated at 81, are arranged on each side of each member 33. Half of each spring fits into a slot 82 formed in the face plate 41, with the other half of each spring fitting into a mating slot 83 formed in each of the jaw members 33.

To insure that the jaw members 33 are retained within the slots 43, a retaining plate 93 is secured to the face member 41.

In a typical operating sequence, the draw bar 36 is shifted rightwardly, as seen in FIG. 3, to open the chuck and receive the workpiece WP-1 within the chuck assembly 12. The workpiece Wp-1 is positioned within the chuck and the draw bar 36 is shifted leftwardly. The actuator block 38 and ring member 37 are also shifted leftwardly so that the jaw members 33 are moved along the ramp surfaces 34 and caused to engage with the workpiece WP-1. The jaw members 33 are preferably serrated, as indicated at 91 in FIG. 3, for better engagement with the workpiece.

The draw bar preferably applies a preselected force upon the chuck members 33 to firmly engage them upon the workpiece WP-1. Because of the large number of jaw members, this preselected force is sufficient to securely hold the workpiece within the jaw members as the chuck assembly 12 is set into high speed rotation for a conventional friction welding operation. At some point during the welding operation, the chuck assemblies 12 and 13 are moved together so that the workpieces WP-1 and WP-2 are brought into axial engagement under considerable force. Referring particularly to FIG. 3, this large axial force is transferred through the workpiece WP-1 and the backup plate 61 to the actuator block 38. The actuator block 38 and ring member 37 are accordingly shifted further to the left so that the jaw members are also shifted further upon their respective ramp surfaces 34. In this manner, engagement of the jaw members upon the workpiece WP-1 is further increased to insure that the workpieces remain in alignment during the welding operation and to prevent any undesirable slippage between the workpiece WP-1 and the rotating chuck assembly 12.

Once the welding operation is completed, the bonded workpieces are removed by again separating the chuck assemblies and shifting the draw bar 36 in a rightwardly direction. Release of the jaw members 33 from the workpiece is facilitated by the springs 81 and may be further assisted by abutting engagement of the ring member 37 with the respective jaw members 33. The bonded workpieces may then be removed from the tailstock chucks 13 in a conventional manner to permit the insertion of a new pair of workpieces for commencing a new welding operation.

We claim:

1. A chuck assembly for securing a workpiece which is subject to axially applied forces during operation of the chuck, comprising a chuck body means having a generally cylindrical bore means for receiving the workpiece and means defining axially arranged ramp surfaces at a plurality of circumferentially spaced locations within the chuck bore means, a plurality of jaw member means greater than two each having a ramp surface thereon arranged in adjacent respective relation to said chuck bore ramp surfaces within the chuck body means, said jaw member means being movable to permit sliding engagement with said adjacent ramp surfaces and radially inward and outward movement of the jaw member means with respect to the chuck body means and the workpiece, a ring member means coupled to said jaw member means for controlling their axial position in the chuck body means, a drawbar means associated with the ring member means for positioning said jaw member means by means of the ring member means and for initially engaging the jaw member means upon said workpiece, an actuator block means positioned in the chuck body means for axial engagement with said workpiece, said actuator block being associated with the ring member means for transferring axial forces from said workpiece thereacross to said jaw member means and increasing engagement force of said jaw member means upon said workpiece.

2. The invention of claim 1 wherein said jaw member means, the ring member means and the actuator block means are secured against rotation relative to the chuck body while being free for axial movement relative thereto.

3. The invention of claim 1 comprising at least six jaw member means internally arranged about the circumference of the chuck body.

4. The invention of claim 1 further comprising spring means associated with said jaw member means which have a tendency to urge said jaw member means into axial motion in a direction which releases them from engagement with the workpiece.

5. The invention of claim 1 wherein the one said chuck assembly is associated with another chuck assembly for securing another workpiece in axial alignment with said one workpiece, means being associated with the two chuck assemblies for forcibly urging them toward each other and axially engaging the two workpieces.

6. The invention of claim 5 for axially engaging workpieces which are generally tubular, comprising pilot means associated with the two chuck assemblies and being engageable when the two chuck assemblies are urged together for maintaining the two workpieces in radial alignment, the pilot means being arranged for engagement through the tubular workpieces.

7. The invention of claim 6 wherein the two chuck assemblies are adapted for relative rotation and axial engagement of the two workpieces in a friction welding operation.

8. The invention of claim 1 wherein the chuck assembly is suitable for rotating said one workpiece in relation to another workpiece while supporting said one workpiece in axially aligned engagement with the other workpiece in a friction welding operation.

9. The invention of claim 1 wherein the ramp defining means is a ring means fixed against axial and rotational movement relative to the chuck body, the several ramp surfaces being formed within respective slots formed in the fixed ring means, said jaw member means being respectively arranged within said slots.

10. The invention of claim 9 wherein the ring member means has an annular flange and said jaw member means are notched for engagement with the ring member means of said annular flange.

11. The invention of claim 10 further comprising spring means for interacting between each said jaw member means and the fixed ring means with the spring means tending to maintain the jaw member means in abutting relation with the flange of the ring member means.

* * * * *